US011711166B2

(12) United States Patent
Qu et al.

(10) Patent No.: US 11,711,166 B2
(45) Date of Patent: Jul. 25, 2023

(54) INFORMATION TRANSMISSION METHOD AND APPARATUS

(71) Applicant: HUAWEI TECHNOLOGIES CO., LTD., Guangdong (CN)

(72) Inventors: Bingyu Qu, Beijing (CN); Feifei Gu, Shenzhen (CN); Hao Sun, Beijing (CN); Yongxing Zhou, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 37 days.

(21) Appl. No.: 16/715,738

(22) Filed: Dec. 16, 2019

(65) Prior Publication Data
US 2020/0119848 A1 Apr. 16, 2020

Related U.S. Application Data

(63) Continuation of application No. PCT/CN2018/091343, filed on Jun. 14, 2018.

(30) Foreign Application Priority Data

Jun. 16, 2017 (CN) .......................... 201710459795.6

(51) Int. Cl.
 H04L 1/00 (2006.01)
(52) U.S. Cl.
 CPC .......... H04L 1/0091 (2013.01); H04L 1/0034 (2013.01); H04L 1/0038 (2013.01)
(58) Field of Classification Search
 None
 See application file for complete search history.

(56) References Cited

U.S. PATENT DOCUMENTS

| 2009/0046646 A1* | 2/2009 | Cho | ....................... H04J 11/005 370/329 |
| 2014/0301324 A1* | 10/2014 | Cheng | ................... H04L 5/0055 370/329 |

(Continued)

FOREIGN PATENT DOCUMENTS

| CN | 101192875 A | 6/2008 |
| CN | 101998656 A | 3/2011 |

(Continued)

OTHER PUBLICATIONS

U.S. Appl. No. 62/501,060; Park et al.; May 3, 2017 (Year: 2017).*

(Continued)

*Primary Examiner* — The Hy Nguyen
(74) *Attorney, Agent, or Firm* — Fish & Richardson P.C.

(57) ABSTRACT

The present disclosure provides an information transmission method, including: generating first information; determining a first sequence from N candidate sequences based on the first information; and sending the first sequence. The first information belongs to N candidate information. A mapping between the first information and the first sequence belongs to P mappings. Each of the P mappings includes a mapping between the N candidate information and the N candidate sequences. The N candidate sequences are generated based on N dedicated cyclic shift values and a first initial cyclic shift value. In at least two mappings, dedicated cyclic shift values used to generate candidate sequences corresponding to a same candidate information are different, where the same candidate information belongs to L candidate information in the N candidate information, both P and L are integers greater than 1, and the L is less than or equal to N.

20 Claims, 2 Drawing Sheets

(56) References Cited

U.S. PATENT DOCUMENTS

| | | | |
|---|---|---|---|
| 2015/0229455 A1 | 8/2015 | Seo et al. | |
| 2016/0360393 A1 | 12/2016 | Wu et al. | |
| 2019/0052437 A1* | 2/2019 | Han | H04L 5/0055 |
| 2019/0246416 A1* | 8/2019 | Park | H04L 1/1812 |
| 2019/0342135 A1* | 11/2019 | Kwak | H04L 1/1812 |
| 2020/0067680 A1* | 2/2020 | Nayeb Nazar | H04L 5/0055 |
| 2020/0127795 A1* | 4/2020 | Matsumura | H04L 1/1812 |
| 2020/0178242 A1* | 6/2020 | Yamamoto | H04J 11/005 |

FOREIGN PATENT DOCUMENTS

| | | | |
|---|---|---|---|
| CN | 102017462 A | 4/2011 | |
| CN | 102761355 A | 10/2012 | |
| CN | 103178926 A | 6/2013 | |
| CN | 103220109 A | 7/2013 | |
| CN | 103228049 A | 7/2013 | |
| CN | 104935419 A | 9/2015 | |
| EP | 2040409 A2 * | 3/2009 | H04J 11/00 |
| JP | 2010536226 A | 11/2010 | |
| JP | 2018503293 A | 2/2018 | |
| WO | 2016093573 A1 | 6/2016 | |
| WO | 2017082988 A1 | 5/2017 | |
| WO | WO-2018196306 A1 * | 11/2018 | H04L 5/00 |
| WO | 2019031054 A1 | 2/2019 | |
| WO | 2019049346 A1 | 3/2019 | |

OTHER PUBLICATIONS

3GPP TS 38.331 V0.0.3 (May 2017), "3rd Generation Partnership Project; Technical Specification Group Radio Access Network; NR; Radio Resource Control (RRC); Protocol specification (Release 15)," May 2017, 20 pages.

3GPP TS 38.211 V0.0.0 (May 2017), "3rd Generation Partnership Project; Technical Specification Group Radio Access Network; NR; Physical channels and modulation (Release 15)," May 2017, 10 pages.

Extended European Search Report issued in European Application No. 18818511.0 dated Jun. 16, 2020, 11 pages.

Huawei et al., "Short PUCCH for UCI of up to 2 bits," 3GPP TSG RAN WG1 Meeting #91, R1-1719391, Reno, USA, Nov. 27-Dec. 1, 2017, 10 pages.

NTT DOCOMO, Inc., "DMRS-based vs. Sequence-based PUCCH in short duration," 3GPP TSG RAN WG1 Meeting #88, R1-1702811, Athens, Greece, Feb. 13-17, 2017, 9 pages.

Office Action issued in Chinese Application No. 201710459795.6 dated Nov. 26, 2019, 10 pages (with English translation).

OPPO, "Short-PUCCH for UCI of up to 2 bits," 3GPP TSG RAN WG1 Meeting #91, R1-1719991,Reno, USA, Nov. 27-Dec. 1, 2017, 3 pages.

PCT International Search Report and Written Opinion issued in International Application No. PCT/CN2018/091343 dated Sep. 27, 2018, 17 pages (with English translation).

Ericsson,"On the Design of 1-Symbol PUCCH for 1-2 bits UCI," 3GPP TSG RAN WG1 #89, R1-1709080, 3GPP TSG-RAN WG1 #89, R1-1709080, Hangzhou, China, May 15-19, 2017, 8 pages.

Huawei et al., "WF on sPUCCH format for small payload size," 3GPP TSG RAN1 #88, R1-1704037, Athens, Greece, Feb. 13-17, 2017, 8 pages.

LG Electronics, "sPUCCH design for HARQ-ACK feedback with shortened TTI length," 3GPP TSG RAN WG1 Meeting #86, R1-166860, Gothenburg, Sweden, Aug. 22-26, 2016, 8 page.

Office Action issued in Japanese Application No. 2019-569677 dated Feb. 8, 2021, 13 pages (with English translation).

Office Action issued in Chinese Application No. 202011085751.X dated Jul. 1, 2021, 8 pages.

* cited by examiner

INFORMATION TRANSMISSION METHOD AND APPARATUS

CROSS-REFERENCE TO RELATED APPLICATIONS

This application is a continuation of International Application No. PCT/CN2018/091343, filed on Jun. 14, 2018, which claims priority to Chinese Patent Application No. 201710459795.6, filed on Jun. 16, 2017. All of the aforementioned patent applications are hereby incorporated by reference in their entireties.

TECHNICAL FIELD

Embodiments of the present invention relate to the communications field, and more specifically, to an information transmission method and apparatus.

BACKGROUND

Currently, an information transmission method is known. In the method, information is transmitted based on sequence selection. Specifically, when a terminal device transmits K bits information, there are P candidate information for the terminal device. The P candidate information are in a one-to-one correspondence with P candidate sequences (one candidate information is corresponding to one candidate sequence), and $P=2^K$. For this information, the terminal device determines a corresponding sequence based on the information (the terminal device may select, based on the information, a sequence corresponding to the information from the generated P candidate sequences, or the terminal device may generate a corresponding candidate sequence based on each candidate information), to transmit the information in a form of a sequence.

Cyclic shift values of any two of the P candidate sequences are different. Therefore, different information may be differentiated by using cyclic shift values (or different sequences may be differentiated by using cyclic shift values). Specifically, for a same terminal device, cyclic shift values of different candidate information are different. For a same piece of information, cyclic shift values of different terminal devices are also different.

When the terminal device sends the information in a form of a sequence, a network device obtains the information by detecting the sequence, or obtains the information by using a cyclic shift value in the sequence.

When a plurality of terminal devices send, by using a same time-frequency resource, a plurality of sequences corresponding to a plurality of pieces of information, the plurality of terminal devices send the plurality of sequences to the network device through over-the-air linear superposition, and the network device needs to detect the plurality of sequences, to finally obtain each piece of information. However, in a scenario in which delay spread is relatively serious, a relatively large phase deviation is generated after the plurality of sequences pass through a channel. Therefore, during detection for the plurality of sequences, the network device may detect some of the plurality of sequences as other sequences. In particular, at least two sequences having close cyclic shift values interfere with detection for another sequence, and a detection error is apt to occur. Consequently, the network device incorrectly understands some of the plurality of pieces of information, affecting information transmission performance. In addition, in an actual system, transmission reliability of a data channel is usually 90%. That is, in 90% cases, the terminal device feeds back acknowledgement (ACK) information, and feeds back negative acknowledgement (NACK) information otherwise. Therefore, in most cases, a sequence corresponding to the ACK information is interfering with detection performed by the network device for a sequence corresponding to the NACK information.

Therefore, a technology needs to be provided, to help improve information transmission performance.

SUMMARY

Embodiments of the present invention provide an information transmission method, to help improve information transmission performance.

According to a first aspect, an information transmission method is provided, and the method includes: generating first information, where the first information is used to indicate a receiving status of downlink data and/or is used to indicate a scheduling request status;

determining a first sequence from N candidate sequences based on the first information, where the first information belongs to N candidate information, a mapping between the first information and the first sequence belongs to P mappings, each of the P mappings includes a mapping between the N candidate information and the N candidate sequences, the N candidate sequences are generated based on N dedicated cyclic shift values and a first initial cyclic shift value, the N dedicated cyclic shift values are dedicated parameters respectively used to generate the N candidate sequences, and the first initial cyclic shift value is a common parameter used to generate the N candidate sequences; where in at least two mappings, candidate sequences corresponding to a same candidate information are different, where the same candidate information belongs to L candidate information in the N candidate information, both P and L are integers greater than 1, and L is less than or equal to N; and sending the first sequence.

According to the information transmission method provided in this embodiment of the present invention, a mapping between a plurality of candidate information and a plurality of candidate sequences (or a mapping between a plurality of candidate information and a plurality of dedicated cyclic shift values) is provided, and in at least two mappings, candidate sequences corresponding to a same candidate information are different. Therefore, differences between dedicated cyclic shift values used to generate candidate sequences corresponding to different candidate information may be relatively even on the whole, so that differences between cyclic shift values of different candidate information are also relatively even on the whole. In this way, when a plurality of terminal devices transmit information by using a same time-frequency resource (or in a case of resource multiplexing among a plurality of users), this can help reduce consistency interference between information of different terminal devices (that is, between some types of candidate information sent by a majority of terminal devices and the rest types of candidate information sent by a minority of terminal devices), and interference between the information is in a randomized state in an overall system. More specifically, for feedback information in the prior art that is used to indicate a receiving status of downlink data, interference caused to a sequence corresponding to NACK information by a sequence corresponding to ACK information and interference caused to the sequence corresponding to the ACK information by the sequence corresponding to the NACK information can be balanced, thereby helping improve information transmission performance.

With reference to the first aspect, in a first implementation of the first aspect, the mapping between the first information and the first sequence is determined by a first scrambling element group.

With reference to the first aspect, in a second implementation of the first aspect, the first scrambling element group is determined based on at least one of the following information: information about a device identifier used to identify a terminal device, and information about a time unit that carries the first information.

With reference to the first aspect, in a third implementation of the first aspect, the first sequence is determined based on first target information and a first mapping, the first mapping is a mapping between the first target information and the first sequence, the first target information is obtained by processing the first information with the first scrambling element group, and the first mapping is predefined, or the first mapping is configured by a network device through semi-static signaling.

With reference to the first aspect, in a fourth implementation of the first aspect, the first information includes K bits, and $P=2^K$.

Therefore, as many mappings as possible may be set based on permutations of the N candidate sequences (or the N dedicated cyclic shift values), to allow a relatively large quantity of terminal devices to send information, thereby reducing overall system interference when a relatively large quantity of terminal devices send sequences of a plurality of pieces of information by using a same time-frequency resource.

With reference to the first aspect, in a fifth implementation of the first aspect, the first information includes K bits, and $N=2^K$.

With reference to the first aspect, in a sixth implementation of the first aspect, the method further includes:

receiving first indication information, where the first indication information is used to indicate the mapping between the first information and the first sequence.

With reference to the first aspect, in a seventh implementation of the first aspect, the first scrambling element group is partial elements in a pseudo-random sequence, and the pseudo-random sequence is an in-sequence or a Gold sequence.

With reference to the first aspect, in an eighth implementation of the first aspect, that candidate sequences corresponding to a same candidate information are different includes: dedicated cyclic shift values used to generate the candidate sequences corresponding to the same candidate information are different.

According to a second aspect, an information transmission method is provided, and the method includes: receiving a first signal, where the first signal carries at least a first sequence, there is a mapping between the first sequence and first information, and the first information is used to indicate a receiving status of downlink data and/or is used to indicate a scheduling request status;

generating N candidate sequences including the first sequence, where the first information belongs to N candidate information, a mapping between the first information and the first sequence belongs to P mappings, each of the P mappings includes a mapping between the N candidate information and the N candidate sequences, the N candidate sequences are generated based on N dedicated cyclic shift values and a first initial cyclic shift value, the N dedicated cyclic shift values are dedicated parameters respectively used to generate the N candidate sequences, and the first initial cyclic shift value is a common parameter used to generate the N candidate sequences; where in at least two mappings, candidate sequences corresponding to a same candidate information are different, where the same candidate information belongs to L candidate information in the N candidate information, both P and L are integers greater than 1, and L is less than or equal to N; and processing the first signal based on the N candidate sequences, to obtain the first information.

According to the information transmission method provided in this embodiment of the present invention, a mapping between a plurality of candidate information and a plurality of candidate sequences (or a mapping between a plurality of candidate information and a plurality of dedicated cyclic shift values) is provided, and in at least two mappings, candidate sequences corresponding to a same candidate information are different. Therefore, differences between dedicated cyclic shift values used to generate candidate sequences corresponding to different candidate information may be relatively even on the whole, so that differences between cyclic shift values of different candidate information are also relatively even on the whole. In this way, when a plurality of terminal devices transmit information by using a same time-frequency resource (or in a case of resource multiplexing among a plurality of users), this can help reduce consistency interference between information of different terminal devices (that is, between some types of candidate information sent by a majority of terminal devices and the rest types of candidate information sent by a minority of terminal devices), and interference between the information is in a randomized state in an overall system. More specifically, for feedback information in the prior art that is used to indicate a receiving status of downlink data, interference caused to a sequence corresponding to NACK information by a sequence corresponding to ACK information and interference caused to the sequence corresponding to the ACK information by the sequence corresponding to the NACK information can be balanced, thereby helping improve information transmission performance.

With reference to the second aspect, in a first implementation of the second aspect, the mapping between the first information and the first sequence is determined by a first scrambling element group.

With reference to the second aspect, in a second implementation of the second aspect, the first scrambling element group is determined based on at least one of the following information: information about a device identifier used to identify a terminal device, and information about a time unit that carries the first information.

With reference to the second aspect, in a third implementation of the second aspect, the first information is obtained based on first target information and a first mapping, the first mapping is a mapping between the first target information and the first sequence, the first target information is obtained by processing the first information with the first scrambling element group, and the first mapping is predefined, or the first mapping is configured by a network device through semi-static signaling.

With reference to the second aspect, in a fourth implementation of the second aspect, the first information includes K bits, and $P=2^K$.

Therefore, as many mappings as possible may be set based on permutations of the N candidate sequences (or the N dedicated cyclic shift values), to allow a relatively large quantity of terminal devices to send information, thereby reducing overall system interference when a relatively large quantity of terminal devices send sequences of a plurality of pieces of information by using a same time-frequency resource.

With reference to the second aspect, in a fifth implementation of the second aspect, the first information includes K bits, and $N=2^K$.

With reference to the second aspect, in a sixth implementation of the second aspect, the method further includes:

sending first indication information, where the first indication information is used to indicate the mapping between the first information and the first sequence.

With reference to the second aspect, in a seventh implementation of the second aspect, the first scrambling element group is partial elements in a pseudo-random sequence, and the pseudo-random sequence is an m-sequence or a Gold sequence.

With reference to the second aspect, in an eighth implementation of the second aspect, that candidate sequences corresponding to a same candidate information are different includes: dedicated cyclic shift values used to generate the candidate sequences corresponding to the same candidate information are different.

According to a third aspect, an information transmission apparatus is provided, and the apparatus may be a terminal device, or may be a chip inside a terminal device. The apparatus may include a processing unit and a transceiver unit. When the apparatus is a terminal device, the processing unit may be a processor, and the transceiver unit may be a transceiver. The terminal device may further include a storage unit, and the storage unit may be a memory. The storage unit is configured to store an instruction. The processing unit executes the instruction stored in the storage unit, so that the terminal device performs the method according to any one of the first aspect and the possible implementations of the first aspect. When the apparatus is a chip inside a terminal device, the processing unit may be a processor, and the transceiver unit may be an input/output interface, a pin, a circuit, or the like. The processing unit executes an instruction stored in a storage unit, so that the terminal device performs the method according to any one of the first aspect and the possible implementations of the first aspect. The storage unit may be a storage unit (such as a register or a cache) inside the chip, or may be a storage unit (such as a read-only memory or a random access memory) inside the terminal device but outside the chip.

According to a fourth aspect, an information transmission apparatus is provided, and the apparatus may be a network device, or may be a chip inside a network device. The apparatus may include a processing unit and a transceiver unit. When the apparatus is a network device, the processing unit may be a processor, and the transceiver unit may be a transceiver. The network device may further include a storage unit, and the storage unit may be a memory. The storage unit is configured to store an instruction. The processing unit executes the instruction stored in the storage unit, so that the network device performs the method according to any one of the second aspect and the possible implementations of the second aspect. When the apparatus is a chip inside a network device, the processing unit may be a processor, and the transceiver unit may be an input/output interface, a pin, a circuit, or the like. The processing unit executes an instruction stored in a storage unit, so that the network device performs the method according to any one of the second aspect and the possible implementations of the second aspect. The storage unit may be a storage unit (such as a register or a cache) inside the chip, or may be a storage unit (such as a read-only memory or a random access memory) inside the network device but outside the chip.

According to a fifth aspect, a computer program product is provided, and the computer program product includes computer program code. When the computer program. code is run by a communications unit, a processing unit, a transceiver, or a processor of a communications device (such as a network device or a terminal device), the communications device performs the method according to any one of the first aspect, the second aspect, and the implementations of the first aspect and the second aspect.

According to a sixth aspect, a computer readable storage medium is provided, and the computer readable storage medium stores a program. The program enables a communications device (such as a network device or a terminal device) to perform the method according to any one of the first aspect, the second aspect, and the implementations of the first aspect and the second aspect.

In some of the foregoing implementations, each of the P mappings also includes a mapping between the N candidate sequences and the N dedicated cyclic shift values, and an $i^{th}$ dedicated cyclic shift value in the N dedicated cyclic shift values is used to generate an $i^{th}$ candidate sequence in the N candidate sequences.

In some of the foregoing implementations, in the P mappings, a $j^{th}$ candidate sequence that is in a second mapping and that is corresponding to a $j^{th}$ candidate information in the L candidate information is different from a $j^{th}$ candidate sequence that is in a third mapping and that is corresponding to the $j^{th}$ candidate information in the L candidate information. The second mapping and the third mapping belong to the P mappings, and $j\in[1,L]$. The L candidate information belong to the N candidate information.

In some of the foregoing implementations, in the P mappings, a dedicated cyclic shift value used to generate a $j^{th}$ candidate sequence in a second mapping is different from a dedicated cyclic shift value used to generate a $j^{th}$ candidate sequence in a third mapping.

In some of the foregoing implementations, the P mappings are corresponding to P scrambling element groups, and the determining a first sequence from N candidate sequences based on the first information includes:

determining a fourth mapping based on the first scrambling element group, where the fourth mapping belongs to the P mappings, and the first scrambling element group belongs to the P scrambling element groups; and determining the first sequence from the N candidate sequences based on the fourth mapping.

DESCRIPTION OF EMBODIMENTS

Figure 1:
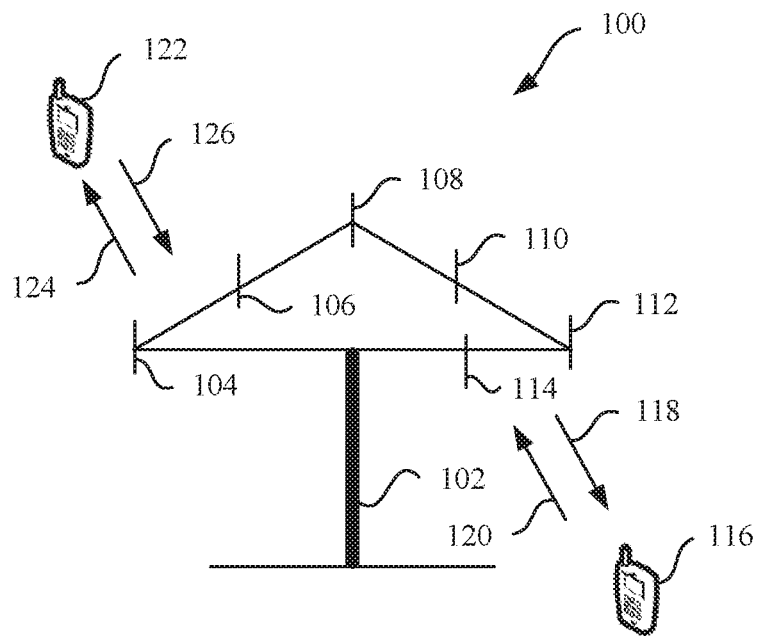
FIG. 1 is a schematic diagram of a communications system for information transmission that is applied to embodiments of the present invention.

The following describes the technical solutions of this application with reference to the accompanying drawings.

Terminologies such as "component", "module", and "system" used in this specification are used to indicate computer-related entities, hardware, firmware, combinations of hardware and software, software, or software being executed. For example, a component may be but is not limited to a process that runs on a processor, a processor, an object, an executable file, a thread of execution, a program, and/or a computer. As shown in figures, both a computing device and an application that runs on a computing device may be components. One or more components may reside within a process and/or a thread of execution, and a component may be located on one computer and/or distributed between two or more computers. In addition, these components may be executed from various computer readable media that store various data structures. For example, the components may communicate by using a local and/or remote process and based on a signal having one or more data packets (for example, data from two components interacting with another component in a local system, a distributed system, and/or in another network such as the Internet that interacts with another system by using the signal).

It should be understood that the embodiments of the present invention may be applied to various communications systems, such as a Global System for Mobile Communications (GSM), a Wideband Code Division Multiple Access (WCDMA) system, and an LTE system. Supported communication is mainly for voice and data communication. Usually, a quantity of connections supported by a conventional base station is limited and can be easily implemented.

A next generation mobile communications system makes possible future mobile data traffic growth, a massive Internet of Things, and diversified new services and application scenarios. In addition to acting as a unified connection framework, a new generation cellular network is provided with a basic 5G new radio interface (5G NR) that is expected to improve the data speed, capacity, delay, reliability, efficiency, and coverage of a network to a new level, and to make full use of each bit of available spectrum resource. In addition, 5G designed based on the orthogonal frequency division multiplexing (OFDM) new radio interface is to become a global standard, supporting 5G devices and diversified deployment, covering diversified spectrums (including low and high frequency bands), and supporting diversified services and terminals.

The embodiments of the present invention are described with respect to a terminal device. The terminal device may also be referred to as user equipment (UE), an access terminal, a subscriber unit, a subscriber station, a mobile station, a mobile, a remote station, a remote terminal, a mobile device, a user terminal, a terminal, a wireless communications device, a user agent, a user apparatus, or the like. The terminal device may be a station (ST) in a wireless local area network (WLAN); or may be a cellular phone, a cordless phone, a Session initiation Protocol (SIP) phone, a wireless local loop (WLL) station, a personal digital assistant (PDA) device, a handheld device having a wireless communication function, a computing device, another processing device connected to a wireless modem, an in-vehicle device, a wearable device, a terminal device in a future 5G network, or a terminal device in a future evolved PLMN network.

In addition, the embodiments of the present invention describe the embodiments with reference to a network device. The network device may be a device, such as a network device, configured to communicate with a mobile device. The network device may be an access point (AP) in a WLAN, or a base transceiver station (BTS) in GSM or Code Division Multiple Access (CDMA); or may be a NodeB (NB) in WCDMA; or may be an evolved NodeB (eNB or eNodeB) in UTE, a relay station or an access point, an in-vehicle device, a wearable device, a network device in a future 5G network, a network device in a future evolved PLMN network, or the like.

The method and apparatus provided in the embodiments of the present invention may be applied to a terminal device or a network device. The terminal device or the network device includes a hardware layer, an operating system layer running on the hardware layer, and an application layer running on the operating system layer. The hardware layer includes hardware such as a central processing unit (CPU), a memory management unit (MMU), and a memory (also referred to as a main memory). The operating system may be any one or more computer operating systems that implement service processing by using processes, such as a Linux operating system, a UNIX operating system, an Android operating system, an iOS operating system, or a Windows operating system. The application layer includes applications such as a browser, an address book, word processing software, and instant messaging software. In addition, a specific structure of an entity that executes the information transmission method is not specially limited in the embodiments of the present invention, provided that the entity can run a program recording code of the information transmission method in the embodiments of the present invention, to perform communication based on the information transmission method in the embodiments of the present invention by. For example, the information transmission method in the embodiments of the present invention may be executed by a terminal device or a network device, or a functional module that is inside a terminal device or a network device and that can call a program to execute the program.

In addition, aspects or features in the embodiments of the present invention may be implemented as a method, an apparatus, or a product that uses standard programming and/or engineering technologies. The term "product" used in the embodiments of the present invention covers a computer program that can be accessed from any computer readable component, carrier, or medium. For example, the computer readable medium may include but is not limited to: a magnetic storage component (for example, a hard disk, a floppy disk, or a magnetic tape), an optical disc (for example, a compact disc (CD), a digital versatile disc (DVD), a smart card and a flash memory component (for example, an erasable programmable read-only memory (EPROM), a card, a stick, or a key drive). In addition, various storage media described in this specification may indicate one or more devices and/or other machine-readable media that are used to store information. The term "machine-readable media" may include but is not limited to a radio channel, and various other media that can store, contain and/or carry an instruction and/or data, FIG. 1 is a schematic diagram of a communications system for information transmission that is applied to the embodiments of the present invention. As shown in FIG. 1, the communications system 100 includes a network device 102. The network device 102 may include a plurality of antennas, for example, antennas 104, 106, 108, 110, 112, and 114. In addition, the network device 102 may additionally include a transmitter chain and a receiver chain. A person of ordinary skill in the art may understand that both the transmitter chain and the receiver chain may include a plurality of components (for example, a processor, a modulator, a multiplexer, a demodulator, a demultiplexer, or an antenna) related to signal sending and receiving.

The network device 102 may communicate with a plurality of terminal devices (for example, a terminal device 116 and a terminal device 122). However, it may be understood that the network device 102 may communicate with any quantity of terminal devices that are similar to the terminal device 116 or 122. For example, the terminal devices 116 and 122 may be cellular phones, smartphones, portable computers, handheld communications devices, handheld computing devices, satellite radio apparatuses, global positioning systems, PDAs, and/or any other proper devices configured to perform communication in the wireless communications system 100.

As shown in FIG. 1, the terminal device 116 communicates with the antennas 112 and 114. The antennas 112 and 114 send information to the terminal device 116 by using a forward link 118, and receive information from the terminal device 116 by using a reverse link 120. In addition, the terminal device 122 communicates with the antennas 104 and 106. The antennas 104 and 106 send information to the terminal device 122 by using a forward link 124, and receive information from the terminal device 122 by using a reverse link 126.

For example, in a frequency division duplex (FDD) system, the forward link 118 may use a frequency band different from that used by the reverse link 120, and the forward link 124 may use a frequency band different from that used by the reverse link 126.

For another example, in a time division duplex (TDD) system and a full duplex system, the forward link 118 and the reverse link 120 may use a same frequency band, and the forward link 124 and the reverse link 126 may use a same frequency band.

Each antenna (or an antenna group including a plurality of antennas) and/or each area that are/is designed for communication is referred to as a sector of the network device 102. For example, the antenna group may be designed to communicate with a terminal device in a sector in coverage of the network device 102. In a process in which the network device 102 respectively communicates with the terminal devices 116 and 122 by using the forward links 118 and 124, a transmit antenna of the network device 102 may improve signal-to-noise ratios of the forward links 118 and 124 through beamforming. In addition, compared with a manner in which a network device sends signals to all terminal devices of the network device by using a single antenna, when the network device 102 sends, through beamforming, signals to the terminal devices 116 and 122 that are randomly scattered in related coverage, less interference is caused to a mobile device in a neighboring cell.

In a given time, the network device 102, the terminal device 116, or the terminal device 122 may be a wireless communications sending apparatus and/or a wireless communications receiving apparatus. When sending data, the wireless communications sending apparatus may encode the data for transmission.

Specifically, the wireless communications sending apparatus may obtain a specific quantity of data bits that need to be sent, by using a channel, to the wireless communications receiving apparatus (for example, generating a specific quantity of data bits, receiving a specific quantity of data bits from another communications apparatus, or storing a specific quantity of data bits in a memory). The data bits may be included in a transport block (or a plurality of transport blocks) of data, and the transport block may be segmented to generate a plurality of code blocks.

In addition, the communications system 100 may be a public land mobile network (PLMN), a D2D network, an M2M network, or another network. FIG. 1 is merely a simplified example schematic diagram. The network may further include another network device that is not drawn in FIG. 1.

With reference to the background, the sequence, cyclic shift value, dedicated cyclic shift value, and initial cyclic shift value in the embodiments of the present invention are first briefly described.

It may be learned from the background that when transmitting information, a terminal device sends the information in a form of a sequence. Each candidate sequence may be generated based on the following formula:

$$y_{s,i} = e^{\frac{2\pi(a_0+n_s)ij}{M}} * x_i, \text{ where}$$

$$\{xi \mid i = 0, 1, 2, \ldots, M-1\}$$

is a sequence, and a $a_0+n_s$ (denoted as $n_t$ for ease of differentiation and understanding) is a cyclic shift value of a sequence $y_{s,t}$. For P candidate sequences corresponding to a same terminal device, $a_0$ is an initial cyclic shift value and is a common parameter used to generate the P candidate sequences, where initial cyclic shift values $a_0$ used to generate all of the P candidate sequences are the same (or different terminal devices are corresponding to different initial cyclic shift values $a_0$ at a same moment, and one terminal device is corresponding to a same initial cyclic shift value $a_0$ at a same moment); $n_s$ is a dedicated cyclic shift value and is a dedicated parameter used by the terminal device to generate each of the P candidate sequences, where different candidate sequences of a same terminal device are corresponding to different dedicated cyclic shift values $n_s$.

Therefore, it may be learned from the description of the foregoing formula that different information may be differentiated by using cyclic shift values $n_t$ (or different sequences may be differentiated by using cyclic shift values $n_t$). To be specific, for a same terminal device, cyclic shift values $n_t$ of different candidate information are different; and for a same piece of information, cyclic shift values $n_t$ of different terminal devices are also different.

Figure 2:
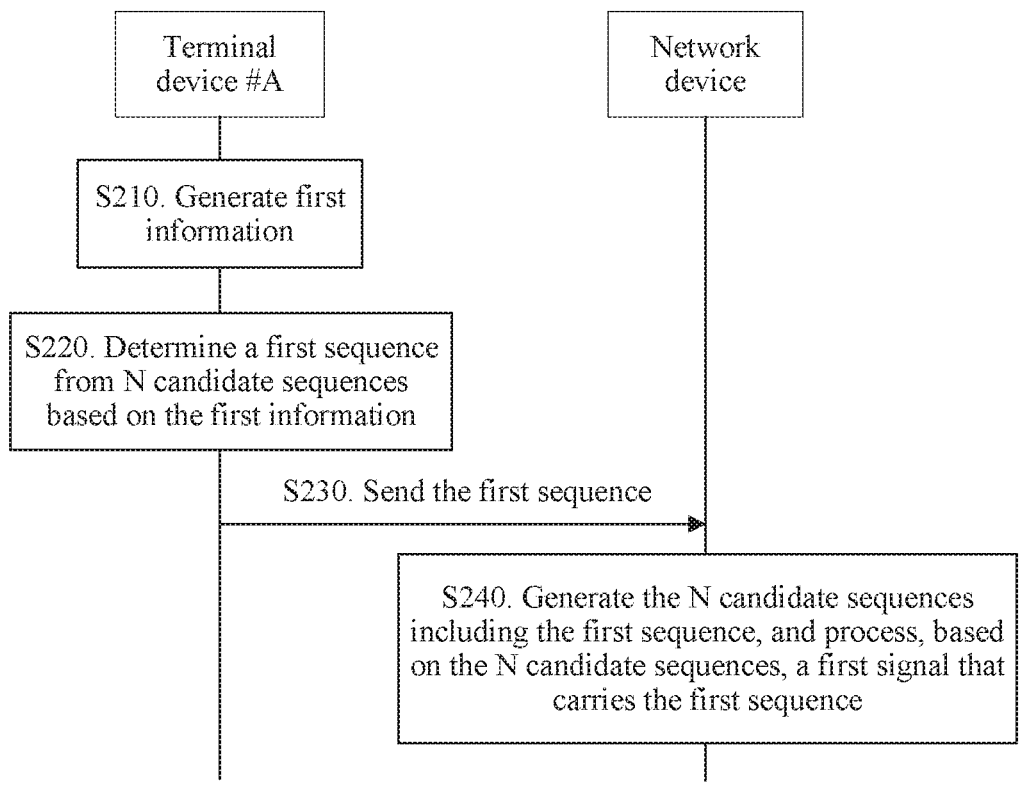
FIG. 2 is a schematic interaction flowchart of an information transmission method according to an embodiment of the present invention.

With reference to FIG. 2, the information transmission method in the embodiments of the present invention is described below in detail. FIG. 2 is a schematic flowchart of an information transmission method according to an embodiment of the present invention from a perspective of device interaction. Execution entities used to implement the method 200 are a network device and a terminal device.

Optionally, the network device may be a base station.

A typical example in which the network device interacts with a terminal device #A (which is an example of the terminal device) is used below to describe in detail the information transmission method according to this embodiment of the present invention.

In S210, the terminal device #A generates information #A (which is an example of first information), and the information ##A is used to indicate a receiving status of downlink data and/or is used to indicate a scheduling request status.

Specifically, three cases may be differentiated for the generating information #A by the terminal device #A. These three cases are described below in detail.

Case 1

The terminal device #A receives at least one transport block sent by the network device, performs demodulation and decoding processing on the at least one transport block, and determines a receiving status of the at least one transport block based on a processing result. The receiving status includes an acknowledgement ACK. and a negative acknowledgement NACK. Therefore, the terminal device #A may generate the information #A based on the receiving status of the at least one transport block.

In this case, the information #A is only used to indicate the receiving status of the downlink data.

Case 2

The terminal device #A needs to send uplink data in a subsequent time. In this case, the terminal device #A needs to send a scheduling request (SR) to the network device, or the terminal device #A needs to send an SR to the network device at a predefined time. The terminal device #A may generate the information #A based on a status of the scheduling request. The status of the scheduling request includes that data scheduling is requested and that data scheduling is not requested.

In this case, the information #A is only used to indicate the scheduling request status.

Case 3

When the terminal device #A determines a receiving status of at least one transport block, and the terminal device #A needs to send an SR to the network device, the terminal device #A may generate the information #A based on the receiving status and a status of the scheduling request.

In this case, the information #A is used to indicate both the receiving status of the downlink data and the scheduling request status.

In this embodiment of the present invention, the information #A may indicate the receiving status of the downlink data and/or the scheduling request status in a plurality of manners.

For example, the information #A includes K bits, and a value of each bit is used to indicate the receiving status of the downlink data, and/or the scheduling request status. The value of each bit has two indication statuses: "0" and "1". When the information #A is only used to indicate the receiving status of the downlink data, "1" may indicate an ACK, and "0" may indicate a NACK; or "0" may indicate an ACK, and "1" may indicate a NACK. In addition, "1" may indicate that data scheduling is requested, and "0" may indicate that data scheduling is not requested; or "0" may indicate that data scheduling is requested, and "1" may indicate that data scheduling is not requested.

In the following, for ease of description, "1" is used to indicate an ACK, "0" is used to indicate a NACK, "1" is used to indicate that data scheduling is requested, and "0" is used to indicate that data, scheduling is not requested.

In addition, there is a correspondence between the K bits and the receiving status of the downlink data and/or the scheduling request status, that is, a value of which bit indicates a receiving status of which transport block, or a value of Which bit indicates the scheduling request status. The correspondence may be protocol-defined, or may be system-defined. This embodiment of the present invention is not limited in this sense.

Specifically, the information #A includes 2 bits, or the information #A is 2-bit information. The information #A is only used to indicate the receiving status of the downlink data. Values of the bits of the information #A are (1 0). In this case, a $1^{st}$ bit indicates a receiving status of a $1^{st}$ transport block, and the receiving status is an ACK; and a $2^{nd}$ bit indicates a receiving status of a $2^{nd}$ transport block, and the receiving status is a NACK. Alternatively, values of the bits of the information #A are (1 0). In this case, a $1^{st}$ bit indicates a receiving status of a $2^{nd}$ transport block, and the receiving status is a NACK; and a $2^{nd}$ bit indicates a receiving status of a $1^{st}$ transport block, and the receiving status is an ACK.

The information #A includes 3 bits, and the information #A is used not only to indicate the receiving status of the downlink data but also to indicate the scheduling request status. Values of the bits of the information #A are (1 0 0). In this case, a $1^{st}$ bit indicates a receiving status of a $1^{st}$ transport block, and the receiving status is an ACK; a $2^{nd}$ bit indicates a receiving status of a $2^{nd}$ transport block, and the receiving status is a NACK; and a $3^{rd}$ bit indicates the scheduling request status, and the scheduling request status is that data scheduling is requested.

For another example, the information #A includes K bits, and there is a correspondence between values of the K bits and the receiving status and/or the scheduling request status. Specifically, (1 1 0) may indicate receiving statuses of three transport blocks, and their receiving statuses are all an ACK; and (1 0 1) may indicate that receiving statuses of two transport blocks are ACKs, and the scheduling request status in this case is that data scheduling is requested.

In S220, the terminal device #A determines a first sequence from N candidate sequences based on the first information. The first information belongs to N candidate information, a mapping between the first information and the first sequence belongs to P mappings, each of the P mappings includes a mapping between the N candidate information and the N candidate sequences, the N candidate sequences are generated based on N dedicated cyclic shift values and a first initial cyclic shift value, the N dedicated cyclic shift values are dedicated parameters respectively used to generate the N candidate sequences, and the first initial cyclic shift value is a common parameter used to generate the N candidate sequences.

In at least two mappings, dedicated cyclic shift values used to generate candidate sequences corresponding to a same candidate information are different. The same candidate information belongs to L candidate information in the N candidate information, both P and L are integers greater than 1, and L is less than or equal to N.

In other words, after determining the information #A, the terminal device 4A determines, based on the P mappings and the information #A, the first sequence corresponding to the information #A.

Specifically, the P mappings each indicates a mapping between candidate information and candidate sequences. There are N candidate information and the N candidate sequences in the P mappings, and in each mapping, the N candidate information are corresponding to the N candidate sequences.

The correspondence described herein means that each candidate sequence expresses the same meaning as corresponding candidate information. Like the information #A, the N candidate information all are used to indicate the receiving status of the downlink data and/or the scheduling request status. In other words, because information is sent in a form of a sequence, it may be understood that each candidate sequence is another representation of corresponding candidate information.

In addition, it should be emphasized herein that in all the mappings, mappings between the N candidate information and the N candidate sequences are different.

For example, P is 2 and N is 2. In other words, in two mappings, there are two candidate information (denoted as candidate information #1 and candidate information #2) and two candidate sequences (denoted as a candidate sequence #1 and a candidate sequence #2). Each mapping indicates a mapping between the two candidate information and the two candidate sequences. In one mapping, the candidate information #1 is corresponding to the candidate sequence #1, and the candidate information #2 is corresponding to the candidate sequence #2. In the other mapping, the candidate information #1 is corresponding to the candidate sequence #2, and the candidate information #2 is corresponding to the candidate sequence #1.

As described above, a candidate sequence is generated based on a cyclic shift value, and the cyclic shift value includes an initial cyclic shift value and a dedicated cyclic shift value. In other words, the candidate sequence is generated based on the initial cyclic shift value and the dedicated cyclic shift value. Herein, without any exception, the N candidate sequences are generated based on the N dedicated cyclic shift values and the first initial cyclic shift value. The N dedicated cyclic shift values are the dedicated parameters respectively used to generate the N candidate sequences, and the first initial cyclic shift value is the common parameter used to generate the N candidate sequences.

To be specific, in each mapping, the N candidate sequences are corresponding to the N dedicated cyclic shift values. Each dedicated cyclic shift value is a dedicated parameter used to generate a corresponding candidate sequence, and the first initial cyclic shift value is the common parameter used to generate the N candidate sequences.

In still other words, in each mapping, an $i^{th}$ dedicated cyclic shift value in the N dedicated cyclic shift values is used to generate an $i^{th}$ candidate sequence in the N candidate sequences, where $i \in [1,N]$, indicating that the N dedicated cyclic shift values and the N candidate sequences are traversed. The first initial cyclic shift value is the common parameter used to generate the N candidate sequences.

Herein, the first initial cyclic shift value is the common parameter used to generate the N candidate sequences, and each dedicated cyclic shift value is the dedicated parameter used to generate the corresponding candidate sequence. Therefore, the P mappings may also be understood as to indicate mappings between the N candidate information and the N dedicated cyclic shift values. In all the mappings, mappings between the N candidate information and the N dedicated cyclic shift values are different. Specific cases are the same as those for the mapping between the N candidate information and the N candidate sequences. To avoid repetition, descriptions are omitted herein.

It should be noted that for different terminal devices, the first initial cyclic shift value may vary. When a same terminal device sends a sequence at different times, the first initial cyclic shift values may also be different. Therefore, for the N candidate sequences in the P mappings, because the first initial cyclic shift values are different for different terminal devices, N candidate sequences corresponding to the different terminal devices are also different. When a same terminal device sends a sequence at different times, corresponding N candidate sequences at different times are also different due to the different first initial cyclic shift values.

However, regardless of how the N candidate sequences change, the N dedicated cyclic shift values in the P mappings may be unchanged. That is, the N dedicated cyclic shift values may not change with the terminal device and time.

In this embodiment of the present invention, in at least two mappings, for the L candidate information in the N candidate information, dedicated cyclic shift values of candidate sequences corresponding to a same candidate information are different. That is, dedicated cyclic shift values that are in the at least two mappings and that are corresponding to the L candidate information are different.

In other words, in the P mappings, for a $j^{th}$ candidate information in the L candidate information, a dedicated cyclic shift value used to generate a $j^{th}$ candidate sequence in a second mapping is different from a dedicated cyclic shift value used to generate a $j^{th}$ candidate sequence in a third mapping. The second mapping and the third mapping belong to the P mappings. That is, the second mapping and the third mapping are any two of the P mappings, and $j \in [1,L]$. The L candidate information belong to the N candidate information.

It should be noted herein that dedicated cyclic shift values that are in at least two mappings and that are corresponding to N-L candidate information may be different, or may be the same.

In this embodiment of the present invention, no limitation is imposed on a quantity of mappings, provided that P is greater than 1. In addition, no limitation is imposed on a quantity of candidate information or a quantity of candidate sequences, provided that N is greater than 1.

With reference to Table 1, the P mappings in this embodiment of the present invention are described below in detail.

Table 1 illustrates P mappings of transmission information according to this embodiment of the present invention. As shown in Table 1, there are four mappings: a mapping #1, a mapping #2, a mapping #3, and a mapping #4; four candidate information: candidate information #1, candidate information #2, candidate information #3, and candidate information #4, which are respectively denoted as (A, N), (N, N), (A, A), and (N, A); and four candidate sequences: a candidate sequence #1, a candidate sequence #2, a candidate sequence #3, and a candidate sequence #4, which are respectively corresponding to dedicated cyclic shift values 0, 6, 9, and 3. In Table 1, a value shown in parentheses after each candidate sequence is a dedicated cyclic shift value corresponding to the candidate sequence, Each of the four mappings indicates a mapping between the four candidate information and the four candidate sequences. The four candidate sequences are corresponding to four dedicated cyclic shift values. That is, each dedicated cyclic shift value is used to generate a corresponding candidate sequence.

The mapping #1 and the mapping #2 are used as an example. In the two mappings, for the candidate information #1, dedicated cyclic shift values in the two mappings are different; for the candidate information #2, dedicated cyclic shift values in the two mappings are also different; for the candidate information #3, dedicated cyclic shift values in the two mappings are the same; and for the candidate information #4, dedicated cyclic shift values in the two mappings are also the same. Therefore, in the two mappings, L is 2, and L is less than N. That is, in the two candidate information, dedicated cyclic shift values corresponding to a same candidate information in the two mappings are different.

Likewise, the mapping #2 and the mapping #3 are used as an example. For each of the four candidate information, dedicated cyclic shift values in the two mappings are different. Therefore, in the two mappings, L is 4, and L is equal to N. That is, in the four candidate information, dedicated cyclic shift values corresponding to a same candidate information in the two mappings are different.

It should be noted that when N is 2, values of L and N are equal.

TABLE 1

| Mapping | Candidate information | | | |
| --- | --- | --- | --- | --- |
| | Candidate information #1 (A, N) | Candidate information #2 (N, N) | Candidate information #3 (A, A) | Candidate information #4 (N, A) |
| Mapping #1 | Candidate sequence #1 (0) | Candidate sequence #2 (6) | Candidate sequence #3 (3) | Candidate sequence #4 (9) |
| Mapping #2 | Candidate sequence #2 (6) | Candidate sequence #1 (0) | Candidate sequence #3 (3) | Candidate sequence #4 (9) |
| Mapping #3 | Candidate sequence #1 (0) | Candidate sequence #2 (6) | Candidate sequence #4 (9) | Candidate sequence #3 (3) |
| Mapping #4 | Candidate sequence #2 (6) | Candidate sequence #1 (0) | Candidate sequence #4 (9) | Candidate sequence #3 (3) |

The terminal device #A selects a mapping from the four mappings based on the generated information #A, and further determines, based on the selected mapping, a candidate sequence corresponding to the information #A, or determines, based on the selected mapping, a dedicated cyclic shift value corresponding to the information #A.

For example, the information #A is the candidate information #1. The terminal device may determine, based on the mapping #1, that the candidate sequence corresponding to the information #A is the candidate sequence #1. In other words, the candidate sequence #1 is the first sequence.

Therefore, in S230, the terminal device #A sends the first sequence to the network device, and the network device receives the first sequence.

It should be noted that when a plurality of terminal devices send a plurality of sequences on a same time-frequency resource, a time-frequency resource carrying the first sequence also carries another sequence. Therefore, the network device not only receives the first sequence, but also receives the another sequence. In this case, the network device receives, on the time-frequency resource, superposition of a plurality of sequences, that is, a first signal.

After receiving the first signal, the network device needs to process the first signal. Therefore, in S240, the network device generates a plurality of sequences including the first sequence, and processes the first signal based on the plurality of sequences, to obtain the first information.

Specifically, the network device generates, based on any one of the P mappings, the N candidate sequences corresponding to the terminal device, and detects the first signal by using the N candidate sequences one by one, to obtain the information #A generated by the terminal device #A. More specifically, the network device detects degrees of matching with at least one sequence in the first signal by using the N candidate sequences one by one, and a sequence in the N candidate sequences that has a highest matching degree is the first sequence. A specific processing manner is similar to that in the prior art, and details are not described herein.

Likewise, the network device also performs the same processing on information of another terminal device. For example, the first signal also carries a second sequence of a terminal device #B, and the network device also generates a plurality of sequences corresponding to the terminal device #B, so as to detect the second sequence by using the plurality of sequences corresponding to the terminal device #B, and obtain, based on a detection result, information corresponding to the second sequence.

It should be understood that in this embodiment of the present invention, the network device generates, by using a mapping the same as that is used by the terminal device to generate the first sequence, N candidate sequences corresponding to N candidate information in the mapping. As an example rather than a limitation, in specific implementation, the network device may determine a mapping in any one of a protocol-defined manner, a signaling-indicated manner, and a preset manner, and further determines a candidate sequence.

An example of feedback information used to indicate a receiving status of downlink data (or a transport block) is used below to briefly describe problems existing in the prior art.

In the prior art, in an aspect, based on implementation of a communications system, a probability that a terminal device sends feedback information indicating that a receiving status is an ACK is much higher than a probability that the terminal device sends feedback information indicating that a receiving status is a NACK (for example, normally, the probability that the feedback information indicating that a receiving status is an ACK is sent is 90%, and the probability that the feedback information indicating that a receiving status is a NACK is sent is 10%). Therefore, usually, when a same time-frequency resource carries a plurality of pieces of feedback information, in the plurality of pieces of feedback information, there are more pieces of feedback information indicating that a receiving status is an ACK than the feedback information indicating that a receiving status is a NACK.

In another aspect, when a plurality of terminal devices send, by using a same time-frequency resource, a plurality of sequences corresponding to a plurality of pieces of feedback information, and when in the plurality of sequences, there are at least two sequences having close cyclic shift values $n_r$, in a scenario in which delay spread is relatively serious, a phase deviation is generated after the plurality of sequences pass through a channel. Therefore, when a network device detects the plurality of sequences based on a detection mechanism of the network device (that is, the network device detects the sequences by using a plurality of candidate sequences corresponding to each terminal device, and determines information by using a matching probability obtained after detection), because the at least two sequences having close cyclic shift values $n_r$, the at least two sequences may interfere with detection for another sequence, detection for the two sequences may be further interfered with by each other, and a detection error is apt to occur. Consequently, the network device incorrectly understands some of the plurality of pieces of information, affecting information transmission performance.

With reference to Table 2, the problems existing in the prior art are described below in detail.

It is assumed that a terminal device #A needs to feed back 1-bit feedback information (denoted as feedback information #A for ease of differentiation and understanding) for a transport block #A, that a receiving status of the transport block #A is an ACK, that a corresponding cyclic shift value (denoted as a cyclic shift value #A for ease of differentiation and understanding) is 0, and that a sequence generated based on the cyclic shift value #A is a sequence #A.

It is assumed that a terminal device #B needs to feed back 1-bit feedback information (denoted as feedback information #B for ease of differentiation and understanding) for a transport block #B, that a receiving status of the transport block #B is a NACK, that a corresponding cyclic shift value (denoted as a cyclic shift value #B for ease of differentiation and understanding) is 7, and that a sequence generated based on the cyclic shift value #B is a sequence #B.

It is assumed that a terminal device #C needs to feed back 1-bit feedback information (denoted as feedback information #C for ease of differentiation and understanding) for a transport block #C, that a receiving status of the transport block #C is an ACK, that a corresponding cyclic shift value (denoted as a cyclic shift value #C for ease of differentiation and understanding) is 2, and that a sequence generated based on the cyclic shift value #C is a sequence #C.

When the sequence #A, the sequence #B, and the sequence #C are superposed and carried on a same time-frequency resource to be sent to a network device in a form of a signal, the network device needs to process the signal, to obtain the sequence #A, the sequence #B, and the sequence #C one by one. A specific process is as follows:

To obtain the feedback information #A, the network device generates two candidate sequences for the terminal device #A, and corresponding cyclic shift values are respectively 0 and 6. The network device detects the signal by separately using a sequence (denoted as a candidate sequence #A1 for ease of differentiation understanding) having the cyclic shift value 0 and a sequence (denoted as a candidate sequence #A2 for ease of differentiation understanding) having the cyclic shift value 6. Normally, compared with the candidate sequence #A2, the candidate sequence #A1 has a higher matching degree, and therefore the network device can correctly obtain the feedback information #A.

Likewise, to obtain the feedback information #C, the network device generates two candidate sequences for the terminal device #C, and corresponding cyclic shift values are respectively 2 and 8. The network device detects the signal by separately using a sequence (denoted as a candidate sequence #C1 for ease of differentiation understanding) having the cyclic shift value 2 and a sequence (denoted as a candidate sequence #C2 for ease of differentiation understanding) having the cyclic shift value 8. Normally, compared with the candidate sequence #C2, the candidate sequence #C1 has a higher matching degree, and therefore the network device can correctly obtain the feedback information #C.

To obtain the feedback information #B, the network device generates two candidate sequences for the terminal device #B, and corresponding cyclic shift values are respectively 1 and 7. The network device detects the signal by separately using a sequence (denoted as a candidate sequence #B1 for ease of differentiation understanding) having the cyclic shift value 1 and a sequence (denoted as a candidate sequence #B2 for ease of differentiation understanding) having the cyclic shift value 7.

It should be noted herein that compared with the candidate sequence #B2, in the three sequences received by the network device, there are more sequences (namely, the sequence #A and the sequence #C) having a cyclic shift value close to that of the candidate sequence #B1, and in addition, it is easy for the network device to detect that the candidate sequence #B1 has a higher matching degree and that the candidate sequence #B2 has a lower matching degree. Therefore, the network device may determine the candidate sequence #B sent by the terminal device as the candidate sequence #B1, that is, understand information indicating that a receiving status is a NACK as information indicating that a receiving status is an ACK.

TABLE 2

| Device | Candidate information | | | |
|---|---|---|---|---|
| | ACK | | NACK | |
| | $a_0$ | $n_s$ | $n_1$ | $n_s$ | $n_1$ |
| Terminal device #A | 0 | 0 | 0 | 6 | 6 |
| Terminal device #B | 1 | 0 | 1 | 6 | 7 |
| Terminal device #C | 2 | 0 | 2 | 6 | 8 |

As described above, based on implementation of the communications system, the probability that the terminal device sends the feedback information indicating that a receiving status is an ACK is much higher than the probability that the terminal device sends the feedback information indicating that a receiving status is a NACK (for example, normally, the probability that the feedback information indicating that a receiving status is an ACK is sent is 90%, and the probability that the feedback information indicating that a receiving status is a NACK is sent is 10%). In many cases, information received by the network device is feedback information indicating that a receiving status is an ACK rather than feedback information indicating that a receiving status is a NACK. When a plurality of terminal devices send feedback information by using a same time-frequency resource, the case for the feedback information #B is easy to occur. In other words, it may also be understood that the feedback information indicating that a receiving status is an ACK interferes with the feedback information indicating that a receiving status is a NACK.

It may be learned through analysis that initial cyclic shift values of different terminal devices are different in parameters used to generate candidate sequences. For a same candidate information, dedicated cyclic shift values of all terminal devices are the same. As a result, cyclic shifts of sequences corresponding to the feedback information that is of different terminal devices and that indicates that a receiving status is an ACK are close to each other. Therefore, when a terminal device feeds back feedback information indicating that a receiving status is a NACK, the feedback information that is sent by the terminal device and that indicates that a receiving status is a NACK may be always interfered with by feedback information that is of another user and that indicates that a receiving status is an ACK.

With reference to Table 3, an example of feedback information used to indicate a receiving status of downlink data (or a transport block) is also used below to describe in detail beneficial effects of this embodiment of present invention.

As described above, it is assumed that a terminal device #A needs to feed back 1-bit feedback information #A for a transport block #A, that a receiving status of the transport block #A is an ACK, that a corresponding dedicated cyclic shift value iiA is 0, that an initial cyclic shift value #A is 0, a cyclic shift value #A is 0, and that a sequence generated based on the cyclic shift value #A is a sequence #A.

It is assumed that a terminal device #B needs to feed back 1-bit feedback information #B for a transport block #B, that a receiving status of the transport block #B is a NACK, that a corresponding dedicated cyclic shift value #B is 0, that an initial cyclic shift value #B is 1, that a corresponding cyclic shift value #B is 1, and that a sequence generated based on the cyclic shift value #B is a sequence #B.

It is assumed that a terminal device #C needs to feed back 1-bit feedback information #C for a transport block #C, that a receiving status of the transport block #C is an ACK, that a corresponding dedicated cyclic shift value #C is 0, an initial cyclic shift value #C is 2, that a corresponding cyclic shift value #C is 2, and that a sequence generated based on the cyclic shift value #C is a sequence #C.

When the sequence #A, the sequence #B, and the sequence #C are carried on a same time-frequency resource and sent to a network device, the network device needs to process a signal to obtain the sequence #A, the sequence #B, and the sequence #C one by one, A specific process is as follows:

To obtain the feedback information #A, the network device generates two candidate sequences for the terminal device #A, and corresponding cyclic shift values are respectively 0 and 6. The network device detects the signal by separately using a candidate sequence #A1 having the cyclic shift value 0 and a candidate sequence #A2 having the cyclic shift value 6. Because there is a relatively large difference between the cyclic shift value 6 of the candidate sequence #A2 and each of the cyclic shift values 0, 1, and 2 that are corresponding to the sequences in the signal, the candidate sequence #A1 has a higher matching degree. Therefore, the network device can correctly obtain the feedback information #A.

Likewise, to obtain the feedback information #C, the network device generates two candidate sequences for the terminal device #C, and corresponding cyclic shift values are respectively 2 and 8. The network device detects the signal by separately using a candidate sequence #C1 having the cyclic shift value 2 and a candidate sequence #C2 having the cyclic shift value 8. Because there is a relatively large difference between the cyclic shift value 8 of the candidate sequence #C2 and each of the cyclic shift values 0, 1, and 2 that are corresponding to the sequences in the signal, the candidate sequence #C1 has a higher matching degree. Therefore, the network device can correctly obtain the feedback information #C.

To obtain the feedback information #B, the network device generates two candidate sequences for the terminal device #B, and corresponding cyclic shift values are respectively 7 and 1. The network device detects the signal by separately using a candidate sequence #B1 having the cyclic shift value 7 and a candidate sequence #B2 having the cyclic shift value 1.

It should be noted herein that because there is a relatively large difference between the cyclic shift value 7 of the candidate sequence #B1 and each of the cyclic shift values 0, 1, and 2 that are corresponding to the sequences in the signal, the candidate sequence #B1 has a lower matching degree, and the candidate sequence #B2 has a higher matching degree. Therefore, the network device can correctly obtain the feedback information #B.

In the prior art, a cyclic shift value of the candidate sequence #B1 is 1, and there is a relatively small difference between the cyclic shift value of the candidate sequence #B1 and each of the cyclic shift values corresponding to the sequences in the signal. Therefore, it is very likely that the network device detects that the candidate sequence #B1 has a higher matching degree and that the candidate sequence #B2 has a lower matching degree, and therefore makes an error in signal detection.

In a same scenario (that is, in a scenario with feedback information indicating that a receiving status is an ACK and feedback information indicating that a receiving status is a NACK), in this embodiment of the present invention, dedicated cyclic shift values corresponding to a same candidate information (or the feedback information) are relatively even on the whole. Therefore, differences between dedicated cyclic shift values of different candidate information are relatively even on the whole, and differences between cyclic shift values of different candidate information are also relatively even on the whole. In this way, based on implementation of the system, when a probability of some candidate information (that is, the feedback information indicating that a receiving status is an ACK) is higher than a probability of the rest candidate information (that is, the feedback information indicating that a receiving status is a NACK), this can help reduce consistency interference caused by the some candidate information to the rest candidate information, so that overall system interference may be randomized.

TABLE 3

| | | Candidate information | | | |
|---|---|---|---|---|---|
| | | ACK | | NACK | |
| Device | $a_0$ | $n_s$ | $n_1$ | $n_s$ | $n_1$ |
| Terminal device #A | 0 | 0 | 0 | 6 | 6 |
| Terminal device #B | 1 | 6 | 7 | 0 | 1 |
| Terminal device #C | 2 | 0 | 2 | 6 | 8 |

According to the information transmission method provided in this embodiment of the present invention, a mapping between a plurality of candidate information and a plurality of candidate sequences (or a mapping between a plurality of candidate information and a plurality of dedicated cyclic shift values) is provided, and in at least two mappings, candidate sequences corresponding to a same candidate information are different. Therefore, differences between dedicated cyclic shift values used to generate candidate sequences corresponding to different candidate information may be relatively even on the whole, so that differences between cyclic shift values of different candidate information are also relatively even on the whole. In this way, when a plurality of terminal devices transmit information by using a same time-frequency resource (or in a case of resource multiplexing among a plurality of users), this can help reduce consistency interference between information of different terminal devices (that is, between some types of candidate information sent by a majority of terminal devices and the rest types of candidate information sent by a minority of terminal devices), and interference between the information is in a randomized state in an overall system. More specifically, for feedback information in the prior art that is used to indicate a receiving status of downlink data, interference caused to a sequence corresponding to NACK information by a sequence corresponding to ACK information and interference caused to the sequence corresponding to the ACK information by the sequence corresponding to the NACK information can be balanced, thereby helping improve information transmission performance.

Optionally, the information #A includes K bits, and $P=2^K$.

To be specific, there is a relationship between a quantity of mappings and a quantity of bits included in the information #A, that is, $P=2^K$. Therefore, as many mappings as possible may be set based on permutations of the N candidate sequences (or the N dedicated cyclic shift values), to allow a relatively large quantity of terminal devices to send information, thereby reducing overall system interference when a relatively large quantity of terminal devices send sequences of a plurality of pieces of information by using a same time-frequency resource.

Certainly, as an example rather than a limitation, a value of P may also be any integer greater than 1.

Optionally, the information #A includes K bits, and $N=2^K$.

Likewise, there is also a mapping between the quantity of bits included in the information #A and a quantity of candidate information or a quantity of candidate sequences, that is, $N=2^K$.

As an example rather than a limitation, a value of N may also be any integer greater than 1.

Optionally, the mapping between the information #A and the first sequence is determined by a first scrambling element group.

To be specific, the terminal device #A may determine a mapping #A from the P mappings by using a scrambling element group #A (that is, an example of the first scrambling element group), so as to determine the first sequence based on the mapping #A and the information #A.

Therefore, for the P mappings, there is also a mapping between the P mappings and P scrambling element groups. That is, each mapping is corresponding to one scrambling element group. In this embodiment of the present invention, two cases are differentiated for the specific mapping: case A and case B. The two cases are described below in detail.

Case A

There is a mapping between the P mappings and the P scrambling element groups, and each scrambling element group is used to determine a corresponding mapping. In other words, the P scrambling element groups may be used as indexes of the P mappings. That is, the terminal device or the network device may directly determine, based on a currently determined scrambling element group, a mapping to be used, to determine, from the mapping corresponding to the current scrambling element group, the first sequence corresponding to the information #A.

Table 4 shows a mapping between the P mappings and the P scrambling element groups in this embodiment of the present invention. As shown in Table 4, P is 4 and N is 4. In other words, there are four mappings, and four candidate information. Each mapping is corresponding to one scrambling element group. To be specific, a mapping #1 is corresponding to a scrambling element group #1, a mapping #2 is corresponding to a scrambling element group #2, a mapping #3 is corresponding to a scrambling element group #3, and a mapping #4 is corresponding to a scrambling element group #4.

Certainly, the quantity of scrambling elements included in each scrambling element group may alternatively be greater than $\log_2 P$. This is not limited in this embodiment of the present invention.

Therefore, the terminal device #A may determine the scrambling element group #A, where the scrambling element group #A is any one of the P scrambling element groups. Then, based on the scrambling element group #A, the terminal device #A determines, from the P mappings, the mapping #A corresponding to the scrambling element group #A (the mapping is a mapping in the P mappings that is corresponding to the scrambling element group #A), and determines, from the N candidate sequences based on the mapping #A, the first sequence corresponding to the information #A.

It should be understood that, it may be learned from above that each of the P mappings is determined based on a corresponding scrambling element group. Therefore, in each of mappings, a mapping between any candidate information and a corresponding candidate sequence is also determined based on a scrambling element group corresponding to the mapping.

Likewise, when generating the N candidate sequences for the terminal device #A, the network device may also determine, based on a corresponding scrambling element group, a mapping and the N candidate sequences corresponding to the terminal device.

For example, the mapping between the information #A generated by the terminal device #A and the first sequence is the mapping #A. In this case, when generating the N candidate sequences, the network device also determines the N candidate sequences based on the mapping #A, to obtain the information #A.

Case B

The P scrambling element groups may be used as scrambling bits of the N candidate information. The N candidate information in each mapping are scrambled by using a same scrambling element group, to obtain N pieces of target information, respectively, so as to further establish a mapping between the N pieces of target information and the N candidate sequences.

In this embodiment of the present invention, the mapping between the N pieces of target information and the N

TABLE 4

|  |  | Candidate information #1 | Candidate information #2 | Candidate information #3 | Candidate information #4 |
| --- | --- | --- | --- | --- | --- |
| Scrambling element group #1 | Mapping #1 | 0 | 6 | 3 | 9 |
| Scrambling element group #2 | Mapping #2 | 6 | 0 | 3 | 9 |
| Scrambling element group #3 | Mapping #3 | 0 | 6 | 9 | 3 |
| Scrambling element group #4 | Mapping #4 | 6 | 0 | 9 | 3 |

As an example rather than a limitation, based on permutations of numbers, a quantity of scrambling elements included in each scrambling element group may be $\log_2 P$. That is, there is a relationship between a quantity of bits included in the scrambling element group and the quantity of mappings.

candidate sequences may be system-predefined, or may be configured by the network device by sending semi-static signaling. This embodiment of the present invention is not limited thereto. For example, the mapping may also be configured by the network device by using dynamic signaling.

Table 5 shows another mapping between the P mappings and the P scrambling element groups in this embodiment of the present invention. As shown in Table 5, P is 4 and N is 4. In other words, there are four mappings, and four candidate information. Each mapping is corresponding to one scrambling element group. To be specific, a mapping #1 is corresponding to a scrambling element group #1, a mapping #2 is corresponding to a scrambling element group #2, a mapping #3 is corresponding to a scrambling element group #3, and a mapping #4 is corresponding to a scrambling element group #4. The four candidate information in the mapping #1 are scrambled by using scrambling bits in the scrambling element group #1, to obtain corresponding four pieces of target information, respectively. The mapping #1 is further subdivided into mappings between the N pieces of target information and the N candidate sequences. Likewise, the same processing is performed for the N candidate information and the N candidate sequences in the other three mappings. Details are not described herein again.

In addition, specific scrambling processing for each candidate information is similar to that in the prior art, and details are not described herein again.

and the N candidate sequences, the N candidate sequences corresponding to the information #A, and further process a received signal based on the N candidate sequences, to obtain the information #A.

Optionally, the method further includes the following:

The terminal device #A receives first indication information, and the first indication information is used to indicate the mapping between the first information and the first sequence.

To be specific, the network device may indicate the mapping between the information #A and the first sequence by using the first indication information, so that the terminal device #A determines the first based on the first indication information.

Optionally, the first scrambling element group is determined based on at least one of the following information: information about a device identifier used to identify the terminal device, and information about a time unit that carries the first information.

In other words, each scrambling element group can be determined based on at least one piece of the foregoing

TABLE 5

| | | Candidate information #1 Target information #1 | Candidate information #2 Target information #2 | Candidate information #3 Target information #3 | Candidate information #4 Target information #4 |
|---|---|---|---|---|---|
| Scrambling element group #1 | Mapping #1 | 0 | 6 | 3 | 9 |
| Scrambling element group #2 | Mapping #2 | 6 | 0 | 3 | 9 |
| Scrambling element group #3 | Mapping #3 | 0 | 6 | 9 | 3 |
| Scrambling element group #4 | Mapping #4 | 6 | 0 | 9 | 3 |

It should be noted that when scrambling processing is performed on candidate information, a quantity of bits in a scrambling element group is the same as a quantity of bits in the candidate information.

In addition, as an example rather than a limitation, there may be a relationship between a quantity of scrambling element groups and a quantity of bits included in a scrambling element group. For example, if a quantity of bits included in each scrambling element group is also K, the quantity of scrambling element groups may be $P=2^K$.

Therefore, the terminal device #A may generate the first sequence based on target information #A that is obtained after scramble processing is performed on the information #A based on the determined scrambling element group #A.

Likewise, when generating the N candidate sequences for the terminal device #A, the network device may determine the mapping by using the corresponding scrambling element group, and determine, based on the mapping between the N pieces of target information and the N candidate sequences, the target information #A corresponding to the information #A, and further perform descrambling processing on the target information #A, to obtain the information #A.

In some implementations, the network device may directly determine, based on the N candidate information, and the mapping between the N pieces of target information information, and any terminal device can determine a scrambling element group based on at least one piece of the foregoing information.

Specifically, a scrambling element group is related to a device identifier of a terminal device, and device identifiers of different terminal devices may be used to generate different scrambling sequences. Further, time units carrying the information #A (for example, a timeslot or a mini-timeslot) may also be used to generate different scrambling sequences, and a scrambling element group that needs to be used is determined from the scrambling sequences. For example, a scrambling sequence corresponding to a device identifier 1 of a terminal device is 01"00"10101010, and a scrambling sequence corresponding to a device identifier 2 of the terminal device is 10"10"10110111. In a timeslot numbered 1 that carries the information A, the two groups of scrambling elements are respectively corresponding to "00" and "10".

Optionally, the first scrambling element group is partial elements in a pseudo-random sequence, and the pseudo-random sequence is an m-sequence or a Gold sequence.

The m-sequence is short for a longest linear shift register sequence, and is also a pseudo-random sequence widely used currently. The Gold sequence is a pseudo-random sequence that has a relatively good characteristic and that is proposed and analyzed based on the m-sequence.

As an example rather than a limitation, the first scrambling element group may also be other scrambling bits, for example, a GMW sequence or a Bent sequence.

According to the information transmission method provided in this embodiment of the present invention, a mapping between a plurality of candidate information and a plurality of candidate sequences (or a mapping between a plurality of candidate information and a plurality of dedicated cyclic shift values) is provided, and in at least two mappings, candidate sequences corresponding to a same candidate information are different. Therefore, differences between dedicated cyclic shift values used to generate candidate sequences corresponding to different candidate information may be relatively even on the whole, so that differences between cyclic shift values of different candidate information are also relatively even on the whole. In this way, when a plurality of terminal devices transmit information by using a same time-frequency resource (or in a case of resource multiplexing among a plurality of users), this can help reduce consistency interference between information of different terminal devices (that is, between some types of candidate information sent by a majority of terminal devices and the rest types of candidate information sent by a minority of terminal devices), and interference between the information is in a randomized state in an overall system. More specifically, for feedback information in the prior art that is used to indicate a receiving status of downlink data, interference caused to a sequence corresponding to NACK information by a sequence corresponding to ACK information and interference caused to the sequence corresponding to the ACK information by the sequence corresponding to the NACK information can be balanced, thereby helping improve information transmission performance.

In addition, as many mappings as possible may be set based on permutations of the N candidate sequences (or the N dedicated cyclic shift values), to allow a relatively large quantity of terminal devices to send information, thereby reducing overall system interference when a relatively large quantity of terminal devices send sequences of a plurality of pieces of information by using a same time-frequency resource.

The information transmission method according to the embodiments of the present invention is described above with reference to FIG. 1 and FIG. 2, and an information transmission apparatus according to the embodiments of the present invention is described below with reference to FIG. 3 and FIG. 4. Technical features described in the method embodiment are also applicable to the following apparatus embodiments.

Figure 3:
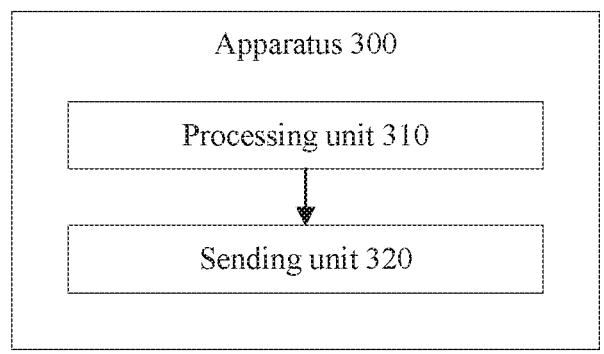
FIG. 3 is a schematic block diagram of an information transmission apparatus according to an embodiment of the present invention.

FIG. 3 is a schematic block diagram of an information transmission apparatus 300 according to an embodiment of the present invention. As shown in FIG. 3, the apparatus 300 includes a processing unit 310 and a sending unit 320.

The processing unit 310 is configured to generate first information, where the first information is used to indicate a receiving status of downlink data and/or is used to indicate a scheduling request status.

The processing unit 310 is further configured to determine a first sequence from N candidate sequences based on the first information, where the first information belongs to N candidate information, a mapping between the first information and the first sequence belongs to P mappings, each of the P mappings includes a mapping between the N candidate information and the N candidate sequences, the N candidate sequences are generated based on N dedicated cyclic shift values and a first initial cyclic shift value, the N dedicated cyclic shift values are dedicated parameters respectively used to generate the N candidate sequences, and the first initial cyclic shift value is a common parameter used to generate the N candidate sequences.

In at least two mappings, dedicated cyclic shift values used to generate candidate sequences corresponding to a same candidate information are different. The same candidate information belongs to L candidate information in the N candidate information, both P and L are integers greater than 1, and L is less than or equal to N.

The sending unit 320 is configured to send the first sequence generated in the processing unit 310.

According to the information transmission apparatus provided in this embodiment of the present invention, a mapping between a plurality of candidate information and a plurality of candidate sequences (or a mapping between a plurality of candidate information and a plurality of dedicated cyclic shift values) is provided, and in at least two mappings, candidate sequences corresponding to a same candidate information are different. Therefore, differences between dedicated cyclic shift values used to generate candidate sequences corresponding to different candidate information may be relatively even on the whole, so that differences between cyclic shift values of different candidate information are also relatively even on the whole. In this way, for when a plurality of apparatuses transmit information by using a same time-frequency resource (or in a case of resource multiplexing among a plurality of users), this can help reduce consistency interference between information of different terminal devices (that is, between some types of candidate information sent by a majority of apparatuses and the rest types of candidate information sent by a minority of apparatuses), and interference between the information is in a randomized state in an overall system. More specifically, for feedback information in the prior art that is used to indicate a receiving status of downlink data, interference caused to a sequence corresponding to NACK information by a sequence corresponding to ACK information and interference caused to the sequence corresponding to the ACK information by the sequence corresponding to the HACK information can be balanced, thereby helping improve information transmission performance.

Optionally, the mapping between the first information and the first sequence is determined by a first scrambling element group.

Optionally, the first scrambling element group is determined based on at least one of the following information: information about a device identifier used to identify a terminal device, and information about a time unit that carries the first information.

Optionally, the first sequence is determined based on first target information and a first mapping, the first mapping is a mapping between the first target information and the first sequence, the first target information is obtained by processing the first information with the first scrambling element group, and the first mapping is predefined, or the first mapping is configured by a network device through semi-static signaling.

Optionally, the first information includes K bits, and $P=2^K$.

Therefore, as many mappings as possible may be set based on permutations of the N candidate sequences (or the N dedicated cyclic shift values), to allow a relatively large quantity of terminal devices to send information, thereby reducing overall system interference when a relatively large quantity of terminal devices send sequences of a plurality of pieces of information by using a same time-frequency resource.

Optionally, the first information includes K bits, and $N=2^K$.

Optionally, the apparatus further includes:

a receiving unit 330, configured to receive first indication information, where the first indication information is used to indicate the mapping between the first information and the first sequence.

Optionally, the first scrambling element group is partial elements in a pseudo-random sequence, and the pseudo-random sequence is an m-sequence or a Gold sequence.

According to the information transmission apparatus provided in this embodiment of the present invention, a mapping between a plurality of candidate information and a plurality of candidate sequences (or a mapping between a plurality of candidate information and a plurality of dedicated cyclic shift values) is provided, and in at least two mappings, candidate sequences corresponding to a same candidate information are different. Therefore, differences between dedicated cyclic shift values used to generate candidate sequences corresponding to different candidate information may be relatively even on the whole, so that differences between cyclic shift values of different candidate information are also relatively even on the whole. In this way, when a plurality of apparatuses transmit information by using a same time-frequency resource (or in a case of resource multiplexing among a plurality of users), this can help reduce consistency interference between information of different terminal devices (that is, between some types of candidate information sent by a majority of apparatuses and the rest types of candidate information sent by a minority of apparatuses), and interference between the information is in a randomized state in an overall system. More specifically, for feedback information in the prior art that is used to indicate a receiving status of downlink data, interference caused to a sequence corresponding to NACK information by a sequence corresponding to ACK information and interference caused to the sequence corresponding to the ACK information by the sequence corresponding to the NACK information can be balanced, thereby helping improve information transmission performance.

In addition, as many mappings as possible may be set based on permutations of the N candidate sequences (or the N dedicated cyclic shift values), to allow a relatively large quantity of terminal devices to send information, thereby reducing overall system interference when a relatively large quantity of terminal devices send sequences of a plurality of pieces of information by using a same time-frequency resource.

The information transmission apparatus 300 may be corresponding to the terminal device described in the method 200 (for example, may be configured in the terminal device or may be the terminal device), and modules or units in the information transmission apparatus 300 are used to perform actions or processing processes performed by the terminal device in the method 200. To avoid repetition, details are not described herein.

In this embodiment of the present invention, the apparatus 300 may be a terminal device in this case, the apparatus 300 may include a processor, a transmitter, and a receiver. The processor, the transmitter, and the receiver are communicatively connected. Optionally, the apparatus further includes a memory, and the memory is communicatively connected to the processor. Optionally, the processor, the memory, the transmitter, and the receiver may be communicatively connected. The memory may be configured to store an instruction. The processor is configured to execute the instruction stored in the memory, to control the transmitter to send information or control the receiver to receive a signal.

In this case, the processing unit 310 in the apparatus 300 shown in FIG. 3 may be corresponding to the processor, the sending unit 320 in the apparatus 300 shown in FIG. 3 may be corresponding to the transmitter, the receiving unit 330 in the apparatus 300 shown in FIG. 3 may be corresponding to the receiver, and the processing unit 330 in the apparatus 300 shown in FIG. 3 may also be corresponding to the processor. In another implementation, the transmitter and the receiver may be implemented by one transceiver component.

In this embodiment of the present invention, the apparatus 300 may be a chip (or a chip system) installed in a terminal device. In this case, the apparatus 300 may include a processor and an input/output interface. The processor may be communicatively connected to a transceiver of the terminal device by using the input/output interface. Optionally, the apparatus further includes a memory, and the memory is communicatively connected to the processor. Optionally, the processor, the memory, and the transceiver may be communicatively connected. The memory may be configured to store an instruction. The processor is configured to execute the instruction stored in the memory, to control the transceiver to send information or a signal.

In this case, the sending unit in the apparatus 300 shown in FIG. 3 may be corresponding to the output interface, and the processing unit in the apparatus 300 shown in FIG. 3 may be corresponding to the processor.

It should be noted that the foregoing method embodiments in the embodiments of the present invention may be applied to a processor, or be implemented by a processor. The processor may be an integrated circuit chip and has a signal processing capability. In an implementation process, steps in the foregoing method embodiments may be completed by using a hardware integrated logic circuit in the processor, or by using an instruction in a form of software. The processor may be a general purpose processor, a digital signal processor (DSP), an application-specific integrated circuit (ASIC), a field programmable gate array (FPGA) or another programmable logic device, a discrete gate or transistor logic device, or a discrete hardware component. The processor may implement or perform the methods, the steps, and logical block diagrams that are disclosed in the embodiments of the present invention. The general purpose processor may be a microprocessor, or the processor may be any conventional processor or the like. Steps in the methods disclosed with reference to the embodiments of the present invention may be directly performed and completed by a hardware decoding processor, or may be performed and completed by using a combination of hardware and software modules in a decoding processor. The software module may be located in a storage medium mature in the art, such as a random access memory, a flash memory, a read-only memory, a programmable read-only memory, an electrically erasable programmable memory, or a register. The storage medium is located in a memory, and the processor reads information in the memory and completes the steps in the foregoing methods in combination with hardware of the processor.

It may be understood that the memory in the embodiments of the present invention may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. Through description used as an example rather than a limitation, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus random access memory (DR RAM). It should be noted that the memory of the systems and methods described in this specification includes but is not limited to these memories and any memory of another proper type.

Figure 4:
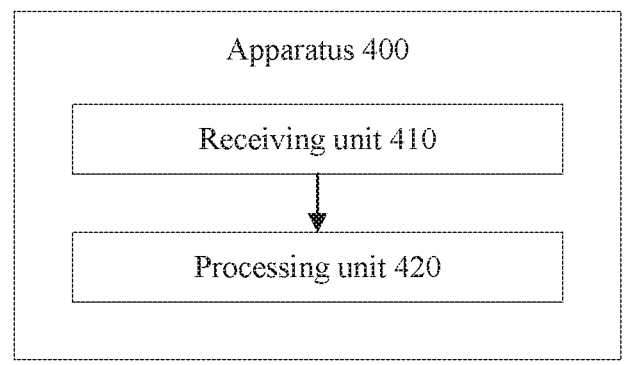
FIG. 4 is a schematic block diagram of an information transmission apparatus according to an embodiment of the present invention.

FIG. 4 is a schematic block diagram of an information transmission apparatus 400 according to an embodiment of the present invention. As shown in FIG. 4, the apparatus 400 includes:

a receiving unit 410, configured to receive a first signal, where the first signal carries at least a first sequence, there is a mapping between the first sequence and first information, and the first information is used to indicate a receiving status of downlink data and/or is used to indicate a scheduling request status; and a processing unit 420, configured to generate N candidate sequences including the first sequence received by the receiving unit 410, where the first information belongs to N candidate information, a mapping between the first information and the first sequence belongs to P mappings, each of the P mappings includes a mapping between the N candidate information and the N candidate sequences, the N candidate sequences are generated based on N dedicated cyclic shift values and a first initial cyclic shift value, the N dedicated cyclic shift values are dedicated parameters respectively used to generate the N candidate sequences, and the first initial cyclic shift value is a common parameter used to generate the N candidate sequences.

In at least two mappings, dedicated cyclic shift values used to generate candidate sequences corresponding to a same candidate information are different. The same candidate information belongs to L candidate information in the N candidate information, both P and L are integers greater than 1, and L is less than or equal to N.

The processing unit 420 is further configured to process the first signal based on the N candidate sequences, to obtain the first information.

According to the information transmission apparatus provided in this embodiment of the present invention, a mapping between a plurality of candidate information and a plurality of candidate sequences (or a mapping between a plurality of candidate information and a plurality of dedicated cyclic shift values) is provided, and in at least two mappings, candidate sequences corresponding to a same candidate information are different. Therefore, differences between dedicated cyclic shift values used to generate candidate sequences corresponding to different candidate information may be relatively even on the whole, so that differences between cyclic shift values of different candidate information are also relatively even on the whole. In this way, when a plurality of apparatuses transmit information by using a same time-frequency resource (or in a case of resource multiplexing among a plurality of users), this can help reduce consistency interference between information of different terminal devices (that is, between some types of candidate information sent by a majority of apparatuses and the rest types of candidate information sent by a minority of apparatuses), and interference between the information is in a randomized state in an overall system. More specifically, for feedback information in the prior art that is used to indicate a receiving status of downlink data, interference caused to a sequence corresponding to NACK information by a sequence corresponding to ACK information and interference caused to the sequence corresponding to the ACK information by the sequence corresponding to the NACK information can be balanced, thereby helping improve information transmission performance.

Optionally, the mapping between the first information and the first sequence is determined by a first scrambling element group.

Optionally, the first scrambling element group is determined based on at least one of the following information: information about a device identifier used to identify a terminal device, and information about a time unit that carries the first information.

Optionally, the first information is obtained based on first target information and a first mapping, the first mapping is a mapping between the first target information and the first sequence, the first target information is obtained by processing the first information with the first scrambling element group, and the first mapping is predefined, or the first mapping is configured by a network device through semi-static signaling.

Optionally, the first information includes K bits, and $P=2^K$.

Therefore, as many mappings as possible may be set based on permutations of the N candidate sequences (or the N dedicated cyclic shift values), to allow a relatively large quantity of terminal devices to send information, thereby reducing overall system interference when a relatively large quantity of terminal devices send sequences of a plurality of pieces of information by using a same time-frequency resource.

Optionally, the first information includes K bits, and $N=2^K$.

Optionally, the apparatus further includes:

a sending unit 430, configured to send first indication information to the terminal device, where the first indication information is used to indicate the mapping between the first information and the first sequence.

Optionally, the first scrambling element group is partial elements in a pseudo-random sequence, and the pseudo-random sequence is an m-sequence or a Gold sequence.

The information transmission apparatus 400 may be corresponding to the network device described in the method 200 (for example, may be configured in the network device or may be the network device), and modules or units in the information transmission apparatus 400 are used to perform actions or processing processes performed by the network device in the method 200. To avoid repetition, details are not described herein.

In this embodiment of the present invention, the apparatus 400 may be a network device. In this case, the apparatus 400 may include a processor, a transmitter, and a receiver. The processor, the transmitter, and the receiver are communicatively connected. Optionally, the apparatus further includes a memory, and the memory is communicatively connected to the processor. Optionally, the processor, the memory, the transmitter, and the receiver may be communicatively connected. The memory may be configured to store an instruction. The processor is configured to execute the instruction stored in the memory, to control the transmitter to send information or control the receiver to receive a signal.

According to the information transmission apparatus provided in this embodiment of the present invention, a mapping between a plurality of candidate information and a plurality of candidate sequences (or a mapping between a plurality of candidate information and a plurality of dedicated cyclic shift values) is provided, and in at least two mappings, candidate sequences corresponding to a same candidate information are different. Therefore, differences between dedicated cyclic shift values used to generate candidate sequences corresponding to different candidate information may be relatively even on the whole, so that differences between cyclic shift values of different candidate information are also relatively even on the whole. In this way, when a plurality of apparatuses transmit information by using a same time-frequency resource (or in a case of resource multiplexing among a plurality of users), this can help reduce consistency interference between information of different terminal devices (that is, between some types of candidate information sent by a majority of apparatuses and the rest types of candidate information sent by a minority of apparatuses), and interference between the information is in a randomized state in an overall system. More specifically, for feedback information in the prior art that is used to indicate a receiving status of downlink data, interference caused to a sequence corresponding to NACK information by a sequence corresponding to ACK information and interference caused to the sequence corresponding to the ACK information by the sequence corresponding to the NACK information can be balanced, thereby helping improve information transmission performance.

In addition, as many mappings as possible may be set based on permutations of the N candidate sequences (or the N dedicated cyclic shift values), to allow a relatively large quantity of terminal devices to send information, thereby reducing overall system interference when a relatively large quantity of terminal devices send sequences of a plurality of pieces of information by using a same time-frequency resource.

The receiving unit 410 in the apparatus 400 shown in FIG. 4 may be corresponding to the receiver, the processing unit 420 in the apparatus 400 shown in FIG. 4 may be corresponding to the processor, and the sending unit 430 in the apparatus 400 shown in FIG. 4 may be corresponding to the transmitter. In another implementation, the transmitter and the receiver may be implemented by one transceiver component.

In this embodiment of the present invention, the apparatus 400 may be a chip (or a chip system) installed in a network device. In this case, the apparatus 400 may include a processor and an input/output interface. The processor may be communicatively connected to a transceiver of the network device by using the input/output interface. Optionally, the apparatus further includes a memory, and the memory is communicatively connected to the processor. Optionally, the processor, the memory, and the transceiver may be communicatively connected. The memory may be configured to store an instruction. The processor is configured to execute the instruction stored in the memory, to control the transceiver to send information or a signal.

In this case, the sending unit and the receiving unit in the apparatus 400 shown in FIG. 4 may be corresponding to the input/output interface, and the processing unit in the apparatus 400 shown in FIG. 4 may be corresponding to the processor.

It should be noted that the foregoing method embodiments in the embodiments of the present invention may be applied to a processor, or be implemented by a processor.

The processor may be an integrated circuit chip and has a signal processing capability. In an implementation process, steps in the foregoing method embodiments may be completed by using a hardware integrated logic circuit in the processor, or by using an instruction in a form of software. The processor may be a general purpose processor, a digital signal processor (DSP), an application-specific integrated circuit (ASIC), a field programmable gate array (FPGA) or another programmable logic device, a discrete gate or transistor logic device, or a discrete hardware component. The processor may implement or perform the methods, the steps, and logical block diagrams that are disclosed in the embodiments of the present invention. The general purpose processor may be a microprocessor, or the processor may be any conventional processor or the like. Steps in the methods disclosed with reference to the embodiments of the present invention may be directly performed and completed by a hardware decoding processor, or may be performed and completed by using a combination of hardware and software modules in a decoding processor. The software module may be located in a storage medium mature in the art, such as a random access memory, a flash memory, a read-only memory, a programmable read-only memory, an electrically erasable programmable memory, or a register. The storage mediwn is located in a memory, and the processor reads information in the memory and completes the steps in the foregoing methods in combination with hardware of the processor.

It may be understood that the memory in the embodiments of the present invention may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), ora flash memory. The volatile memory may be a random access memory (RAM), and is used as an external cache. Through description used as an example rather than a limitation, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus random access memory (DR RAM). It should be noted that the memory of the systems and methods described in this specification includes but is not limited to these memories and any memory of another proper type.

An embodiment of the present invention further provides a computer program product. The computer program product includes computer program code, and when the computer program is executed by a terminal device (for example, the foregoing information transmission apparatus or terminal device, or specifically, the processing unit in the information transmission apparatus or the processor in the terminal device), the terminal device performs the steps performed by the terminal device in the method 200.

An embodiment of the present invention further provides a computer program product. The computer program product includes computer program code, and when the computer program is executed by a network device (for example, the foregoing information transmission apparatus or network device, or specifically, the processing unit in the information transmission apparatus or the processor in the network device), the network device performs the steps performed by the network device in the method 200.

An embodiment of the present invention further provides a computer readable storage medium. The computer readable storage medium stores a program, and the program enables a terminal device (for example, the foregoing information transmission apparatus or terminal device, or specifically, the processing unit in the information transmission apparatus or the processor in the terminal device) to perform the steps performed by the terminal device in the method 200.

An embodiment of the present invention further provides a computer readable storage medium. The computer readable storage medium stores a program, and the program enables a network device (for example, the foregoing information transmission apparatus or network device, or specifically, the processing unit in the information transmission apparatus or the processor in the network device) to perform the steps performed by the network device in the method 200.

It should be understood that the sequence numbers of the foregoing process do not mean an execution order, and should not be construed as any limitation on the implementation process of the embodiments of the present invention. The execution order of the process should be determined based on functions and internal logic of the process.

It should be understood that the sequence numbers of the foregoing process do not mean an execution order in the embodiments of the present invention, and should not be construed as any limitation on the implementation process of the embodiments of the present invention. The execution order of the process should be determined based on functions and internal logic of the process.

A person of ordinary skill in the art may be aware that the units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use a different method to implement the described functions for each particular application, but it should not be considered that the implementation goes beyond the scope of the embodiments of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present invention, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be indirect couplings or communication connections through some interfaces, apparatuses, or units, and may be in electronic, mechanical, or other forms.

The units described as separate parts may or may not be physically separate. Parts displayed as units may or may not be physical units, and may be located in one position or distributed on a plurality of network units. Some or all of the units may be selected depending on actual requirements to achieve the objectives of the solutions of the embodiments.

In addition, functional units in the embodiments of the present invention may be integrated into one processing unit, or each of the units may exist alone physically, or two or more units are integrated into one unit.

When functions are implemented in the form of a software functional unit and sold or used as an independent product, the functions may be stored in a computer readable storage medium. Based on such an understanding, the technical solutions of the present invention essentially, or the part contributing to the prior art, or some of the technical solutions may be implemented in a form of a software product. The software product is stored in a storage medium, and includes several instructions for instructing a computer device (which may be a personal computer, a server, a network device, or the like) to perform all or some of the steps of the methods described in the embodiments of the present invention. The foregoing storage medium includes: any medium that can store program code, such as a USB flash drive, a removable hard disk, a ROM, a RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
   generating, by a terminal device, first information, wherein the first information indicates a receiving status of downlink data;
   determining, by the terminal device, a first sequence from N candidate sequences based on the first information, N being an integer greater than 1, wherein:
   the first information belongs to N candidate information,
   a mapping between the first information and the first sequence belongs to P mapping relationships,
   each of the P mapping relationships comprises N one-to-one mappings between the N candidate information and the N candidate sequences,
   the N candidate sequences are generated based on N dedicated cyclic shift values and a first initial cyclic shift value,
   the N dedicated cyclic shift values are dedicated parameters respectively used to generate the N candidate sequences,
   the first initial cyclic shift value is a common parameter used to generate the N candidate sequences, and
   in the P mapping relationships, all candidate sequences corresponding to same candidate information are different, wherein the same candidate information belongs to L candidate information in the N candidate information, both P and L are integers greater than 1, and L is less than or equal to N, P and N are even numbers; and
   sending, by the terminal device, the first sequence.

2. The method according to claim 1, wherein the first information comprises K bits, and $P=2^K$, K being an integer greater than 0.

3. The method according to claim 1, wherein the first information comprises K bits, and $N=2^K$, K being an integer greater than 0.

4. The method according to claim 1, further comprising:
receiving, by the terminal device, first indication information, wherein the first indication information indicates a mapping relationship to which the mapping between the first information and the first sequence belongs.

5. The method according to claim 1, wherein dedicated cyclic shift values used to generate at least two of the N candidate sequences corresponding to the same candidate information are different.

6. A method, comprising:
receiving, by a network device, a first signal, wherein the first signal carries at least a first sequence, there is a mapping between first information and the first sequence, and the first information indicates a receiving status of downlink data;
generating, by the network device, N candidate sequences comprising the first sequence, N being an integer greater than 1, wherein:
the first information belongs to N candidate information,
the mapping between the first information and the first sequence belongs to P mapping relationships,
each of the P mapping relationships comprises N one-to-one mappings between the N candidate information and the N candidate sequences, and
the N candidate sequences are generated based on N dedicated cyclic shift values and a first initial cyclic shift value,
the N dedicated cyclic shift values are dedicated parameters respectively used to generate the N candidate sequences,
the first initial cyclic shift value is a common parameter used to generate the N candidate sequences, and
in the P mapping relationships, all candidate sequences corresponding to same candidate information are different, wherein the same candidate information belongs to L candidate information in the N candidate information, both P and L are integers greater than 1, and L is less than or equal to N, P and N are even numbers; and
obtaining, by the network device, the first information by processing the first signal based on the N candidate sequences.

7. The method according to claim 6, wherein the first information comprises K bits, and $P=2^K$, K being an integer greater than 0.

8. The method according to claim 6, wherein the first information comprises K bits, and $N=2^K$, K being an integer greater than 0.

9. The method according to claim 6, wherein the method further comprises:
sending, by the network device, first indication information, wherein the first indication information indicates a mapping relationship to which the mapping between the first information and the first sequence belongs.

10. The method according to claim 6, wherein dedicated cyclic shift values used to generate at least two of the N candidate sequences corresponding to the same candidate information are different.

11. An apparatus, comprising:
a storage medium including executable instructions; and
at least one processor;
wherein the executable instructions, when executed by the at least one processor, cause the apparatus to:
generate first information, wherein the first information indicates a receiving status of downlink data;
determine a first sequence from N candidate sequences based on the first information, N being an integer greater than 1, wherein:
the first information belongs to N candidate information,
a mapping between the first information and the first sequence belongs to P mapping relationships,
each of the P mapping relationships comprises N one-to-one mappings between the N candidate information and the N candidate sequences,
the N candidate sequences are generated based on N dedicated cyclic shift values and a first initial cyclic shift value,
the N dedicated cyclic shift values are dedicated parameters respectively used to generate the N candidate sequences,
the first initial cyclic shift value is a common parameter used to generate the N candidate sequences, and
in the P mapping relationships, all candidate sequences corresponding to same candidate information are different, wherein the same candidate information belongs to L candidate information in the N candidate information, both P and L are integers greater than 1, and L is less than or equal to N, P and N are even numbers; and
send the first sequence.

12. The apparatus according to claim 11, wherein the first information comprises K bits, and $P=2^K$, K being an integer greater than 0.

13. The apparatus according to claim 11, wherein the first information comprises K bits, and $N=2^K$, K being an integer greater than 0.

14. The apparatus according to claim 11, wherein the executable instructions, when executed by the at least one processor, further cause the apparatus to:
receive first indication information, wherein the first indication information indicates a mapping relationship to which the mapping between the first information and the first sequence belongs.

15. The apparatus according to claim 11, wherein dedicated cyclic shift values used to generate at least two of the N candidate sequences corresponding to the same candidate information are different.

16. An apparatus, comprising:
a storage medium including executable instructions; and
at least one processor;
wherein the executable instructions, when executed by the at least one processor, cause the apparatus to:
receive a first signal, wherein the first signal carries at least a first sequence, there is a mapping between first information and the first sequence, and the first information indicates a receiving status of downlink data; and
generate N candidate sequences comprising the first sequence, N being an integer greater than 1, wherein:
the first information belongs to N candidate information,
the mapping between the first information and the first sequence belongs to P mapping relationships,
each of the P mapping relationships comprises N one-to-one a mappings between the N candidate information and the N candidate sequences, the N candidate sequences are generated based on N dedicated cyclic shift values and a first initial cyclic shift value, the N dedicated cyclic shift values are dedicated parameters respectively used to generate the N candidate sequences, the first initial cyclic shift value is a common parameter used to generate the N candidate sequences, and in the P mapping relationships, all candidate sequences corresponding to same candidate information are different, wherein the same candidate information belongs to L candidate information in the N candidate information, both P and L are integers greater than 1, and L is less than or equal to N, P and N are even numbers; and obtain the first information by processing the first signal based on the N candidate sequences.

17. The apparatus according to claim 16, wherein the first information comprises K bits, and $P=2^K$, K being an integer greater than 0.

18. The apparatus according to claim 16, wherein the first information comprises K bits, and $N=2^K$, K being an integer greater than 0.

19. The apparatus according to claim 16, wherein the executable instructions, when executed by the at least one processor, further cause the apparatus to:

send first indication information, wherein the first indication information indicates a mapping relationship to which the mapping between the first information and the first sequence belongs.

20. The apparatus according to claim 16, wherein dedicated cyclic shift values used to generate at least two of the N candidate sequences corresponding to the same candidate information are different.

* * * * *